(12) United States Patent
Corduneanu et al.

(10) Patent No.: US 10,977,723 B2
(45) Date of Patent: Apr. 13, 2021

(54) MATCHING CONTENT PROVIDERS AND INTERESTED CONTENT USERS

(75) Inventors: Adrian Dumitru Corduneanu, Cambridge (CA); Eyal Manor, Plainview, NY (US); Scott Spencer, New York, NY (US); Joerg Heilig, Los Altos, CA (US)

(73) Assignee: Google LLC, Mountain View, CA (US)

( * ) Notice: Subject to any disclaimer, the term of this patent is extended or adjusted under 35 U.S.C. 154(b) by 1519 days.

(21) Appl. No.: 12/507,674

(22) Filed: Jul. 22, 2009

(65) Prior Publication Data

US 2010/0306048 A1 Dec. 2, 2010

Related U.S. Application Data

(60) Provisional application No. 61/182,629, filed on May 29, 2009.

(51) Int. Cl.
*G06Q 30/08* (2012.01)
*G06Q 30/02* (2012.01)

(52) U.S. Cl.
CPC ............. *G06Q 30/08* (2013.01); *G06Q 30/02* (2013.01); *G06Q 30/0241* (2013.01); *G06Q 30/0246* (2013.01); *G06Q 30/0275* (2013.01)

(58) Field of Classification Search
USPC ........................................................ 705/14
See application file for complete search history.

(56) References Cited

U.S. PATENT DOCUMENTS

| 6,970,886 B1 | 11/2005 | Conwell et al. |
| 2002/0046281 A1 | 4/2002 | Cope |

(Continued)

FOREIGN PATENT DOCUMENTS

| CA | 2 303 541 | 9/2001 |
| JP | 2008-033927 | 2/2008 |

(Continued)

OTHER PUBLICATIONS

PCT International Search Report and Written Opinion issued in International Application No. PCT/US2010/036687 dated Dec. 28, 2010.

(Continued)

*Primary Examiner* — Peter H Choi
*Assistant Examiner* — Stephanie Madison Davis
(74) *Attorney, Agent, or Firm* — Fish & Richardson P.C.

(57) ABSTRACT

Methods, systems, and apparatuses to match content providers and interested content users are described. Input indicating an accessing of a network location by a user is received along with the user's identifier. The identifier is obfuscated and transmitted to a content provider configured to provide content to the user at the network location. A re-direct identifier is transmitted to the user instructing the user to directly contact the content provider. When the user contacts the content provider, the user transmits a provider-specific identifier by which the content provider identifies the user and the obfuscated user identifier. The content provider updates a database of obfuscated user identifiers and provider-specific user identifiers based on the received identifiers. Thus, the content provider is enabled to identify interested users based on obfuscated and provider-specific user identifiers.

17 Claims, 5 Drawing Sheets

(56) References Cited

U.S. PATENT DOCUMENTS

| | | |
|---|---|---|
| 2003/0014411 A1 | 1/2003 | Gupta |
| 2003/0079176 A1 | 4/2003 | Kang et al. |
| 2005/0060646 A1 | 3/2005 | Gauthier et al. |
| 2005/0144297 A1 | 6/2005 | Dahlstrom et al. |
| 2007/0208610 A1 | 9/2007 | Pisaris-Henderson et al. |
| 2008/0103903 A1* | 5/2008 | Flake et al. .................... 705/14 |
| 2008/0255944 A1* | 10/2008 | Shah et al. .................... 705/14 |

FOREIGN PATENT DOCUMENTS

| | | |
|---|---|---|
| KR | 2003032676 A | 4/2003 |
| KR | 2009016164 A | 2/2009 |

OTHER PUBLICATIONS

Extended European Search Report issued in European Application No. 10781324.8 dated Sep. 22, 2014, 7 pages.

Chinese Office Action issued in Chinese Application No. 201080023578.9 dated May 7, 2014, 13 pages (with English translation).

Japanese Office Action issued in Japanese Application No. 2012-513322 dated Jan. 7, 2014, 4 pages.

Office Action issued in Korean Application No. 10-2011-7030798 dated Jul. 1, 2016, 20 pages (with English translation).

* cited by examiner

MATCHING CONTENT PROVIDERS AND INTERESTED CONTENT USERS

CROSS-REFERENCE TO RELATED APPLICATIONS

This application claims priority to U.S. Provisional Application No. 61/182,629, filed on May 29, 2009, the entire contents of which are incorporated herein by reference.

TECHNICAL FIELD

This specification describes providing content to users, and particularly enabling content providers to provide content to interested users.

BACKGROUND

Advertisers actively seek to expose their products and services to users, particularly interested users, so that the products and services are purchased. To do so, the advertisers use several media including television, radio, print publications such as newspapers, and the like. Advertisers also use the Internet to expose users to their products and services. One method by which advertisers do so is presenting the advertisement as one of several items of content that the user views while browsing the Internet. For example, a seller of cars can present an advertisement for a particular brand of cars on a web page of a website that is regularly visited by automotive enthusiasts. The advertisement is displayed along with other content on the website. An interested user can contact the advertiser upon viewing the advertisement. In some scenarios, service providers receive advertisements from advertisers. In addition, the advertisers specify characteristics of users that the advertisers target as potential consumers. In such scenarios, based on factors including the specified characteristics, the service provider identifies users who may be potential consumers and present the advertisements to the identified users, for example, on web pages of Internet websites that the identified users browse.

SUMMARY

This specification describes technologies relating to matching content providers and interested content users. Further, the specification describes facilities provided to a content provider to identify, in real-time, users who express interest in content provided by the content provider from a database of users. The content provider knows that the users in the database have previously received content from the content providers. In one example, the content provider is an advertising network and the provided content is an advertisement. The advertising network includes an advertisement server and represents multiple advertisers. The multiple advertisers provide ad creatives and consumer targeting information to the advertising networks server. The advertisement server is configured to provide advertisements based on the consumer targeting information. In such an example, an obfuscated identifier representing a user expressing interest in a product offered by the advertiser is provided to the advertising network in real-time, for example, as the user is browsing a web page of a website. The advertising network maintains a database of network-specific user identifiers representing users who have previously expressed interest in the products of advertisers represented by the network. By comparing the obfuscated user identifier with the network-specific user identifiers, the advertising network determines if the user represented by the obfuscated identifier has previously expressed interest in the advertiser's product. Based on the determination, the advertising network can decide whether or not to present an advertisement to the user. Specifically, for example, the advertisers in the network can decide whether or not to bid, in real-time, in an auction to present advertisements to the user. The techniques described below enable the advertising network to generate the database in a cost-efficient manner while maintaining user privacy.

In one aspect, input is received from a user. The input indicates an accessing of a network location associated with a content provider, by the user. The content provider is configured to provide content to the user. The input includes a user identifier. The user identifier is obfuscated to generate an obfuscated user identifier. The obfuscated user identifier is provided to the content provider and a re-direct identifier previously received from the content provider is transmitted to the user. The re-direct identifier points to a network location associated with the content provider. The re-direct identifier instructs the user to contact the content provider directly for the content. When the user directly contacts the content provider, the user provides the content provider with a provider-specific identifier by which the content provider identifies the user.

This, and other aspects, can include one or more of the following features. For example, receiving the input from the user can include receiving the input from a network browser which the user uses to access multiple network locations. A user-traffic detector can be provided to the content provider. The user-traffic detector can be configured to detect that the user has accessed a network location. The content provider can include the user-traffic detector in multiple network locations. The input can be received from the user when the user accesses one of the multiple network locations that includes the user-traffic detector.

The obfuscated user identifier can be specific to the content provider and can be generated by hashing the user identifier included in the input. Further, a bid can be invited from each of multiple content providers including the content provider for an auction to determine a content provider to provide content to the user. It can be determined that the content provider won the auction. The content provider can be informed that the content provider has won the auction. An intent to provide content to the user can be received from the content provider. The network location to which the re-direct identifier points can be a server associated with the content provider.

In another aspect, a computer-readable medium tangibly embodying software instructions executable by one or more computers to perform operations is described. The operations include receiving a network identifier that identifies an advertising network for providing an advertisement to a user. The advertising network represents multiple advertisers. Each advertiser provides advertisements to the advertising network. The operations include generating a traffic detector based on the network identifier. The traffic detector is configured to detect an accessing of a network location by multiple users when the traffic detector is associated with the network location. The traffic detector is further configured to transmit the network identifier upon detecting the accessing. The advertising network associates the traffic detector with the network location. The operations include receiving an indication of the accessing of the network location by the user. The indication includes the network identifier and a user identifier identifying the user. The advertising network determines to present the advertisement at the network location based on the indication. The operations include transmitting an instruction to the user to contact the advertising network for the advertisement, and transmitting an obfuscated user identifier generated by obfuscating the user identifier to the advertising network. In response to receiving the instruction, the user transmits a request for the advertisement to the advertising network. The request includes network-specific user identifier which the advertising network uses to identify the user.

This, and other aspects, can include one or more of the following features. For example, the traffic detector can be configured to be included in the network location. The network location can be a server executing software program instructions related to the advertising network. The traffic detector can include software program instructions in HTML format embedded in the web page. The traffic detector can include the network identifier. The traffic detector can include an HTML image tag. The indication of the accessing of the network location by the user can be received from a network browser in which the user accesses the network location, in response to the user accessing the network location using the network browser.

The operations can further include receiving a re-direct identifier from the advertising network. The re-direct identifier represents a network resource associated with the advertising network. The operations can further include including the re-direct identifier in the instruction that is transmitted to the user. The user can transmit the re-direct identifier when the user transmits the request for the advertisement to the advertising network. The network resource can be the advertisement. The network resource can be a network location including that advertisement. The network resource can be a network location associated with the advertiser.

In another aspect, a system that includes a receiver, a user-traffic detector generation unit, a user identifier receipt unit, and a re-direct instruction generation unit is described. The receiver includes a network identifier receipt unit configured to receive a network identifier that identifies an advertising network for providing an advertisement to a user. The receiver also includes a re-direct identifier receipt unit configured to receive a re-direct identifier pointing to a network location associated with the advertising network. The re-direct identifier directs a user seeking advertisements associated with the advertising network to the network location.

The user-traffic detector generation unit is configured to generate a traffic detector based on the network identifier. The traffic detector is configured to detect an accessing of a network location by multiple users when the traffic detector is associated with the network location. The traffic detector is further configured to transmit the network identifier upon detecting the accessing. The traffic detector is also configured to associate the generated traffic detector with multiple network locations including the network location associated with the advertising network.

The user identifier receipt unit is configured to determine that the user has accessed one or more of the multiple network locations with which the traffic detector is associated, including the network location associated with the advertising network. The re-direct instruction generation unit is configured to generate an instruction for transmitting to the user, the instruction including the re-direct identifier pointing to the network location associated with the advertising network, the instruction instructing the user to contact the advertising network directly for an advertisement for presenting at the network location accessed by the user.

This, and other aspects, can include one or more of the following features. For example, the system can further include an obfuscation unit configured to generate an obfuscated user identifier by obfuscating the user identifier received by the user identifier receipt unit, and to transmit the obfuscated user identifier to the advertising network. The system can further include an auction unit configured to include advertisers included in the advertising network in an auction for presenting an advertisement to the user when the user identifier receipt unit determines that the user has accessed the network location associated with the advertising network. The system further include a user-traffic detector transmission unit configured to transmit the traffic detector to the advertising network instructing the advertising network to associate the traffic detector with one or more network locations selected by the advertising network.

Particular implementations of the subject matter described in this specification can be implemented to realize one or more of the following potential advantages. The techniques described below can enable content providers to build an association between obfuscated user identifiers and provider-specific user identifiers in a cost-efficient manner. The techniques allow advertising networks to target users based on information about the users that the advertising networks know. Further, the techniques permit only participating advertising networks, and not any advertising network, to receive information about the users. In this sense, the techniques described ensure security of user identity. Specifically, in scenarios in which advertisers compete to present advertisements to a user, the advertisers can learn, prior to competing, if the user is likely to purchase the advertised product. This can reduce the resources spent by the advertiser in advertising to users who may not purchase despite being exposed to the advertised product. Further, content providers can be provided with the ability to identify interested users without knowing the specific identities of the users. In addition, the service that provides the obfuscated user identifiers to content providers can remain unaware of user identity collected by the content providers. Consequently, user privacy can be maintained.

The details of one or more implementations of the specification are set forth in the accompanying drawings and the description below. Other features will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
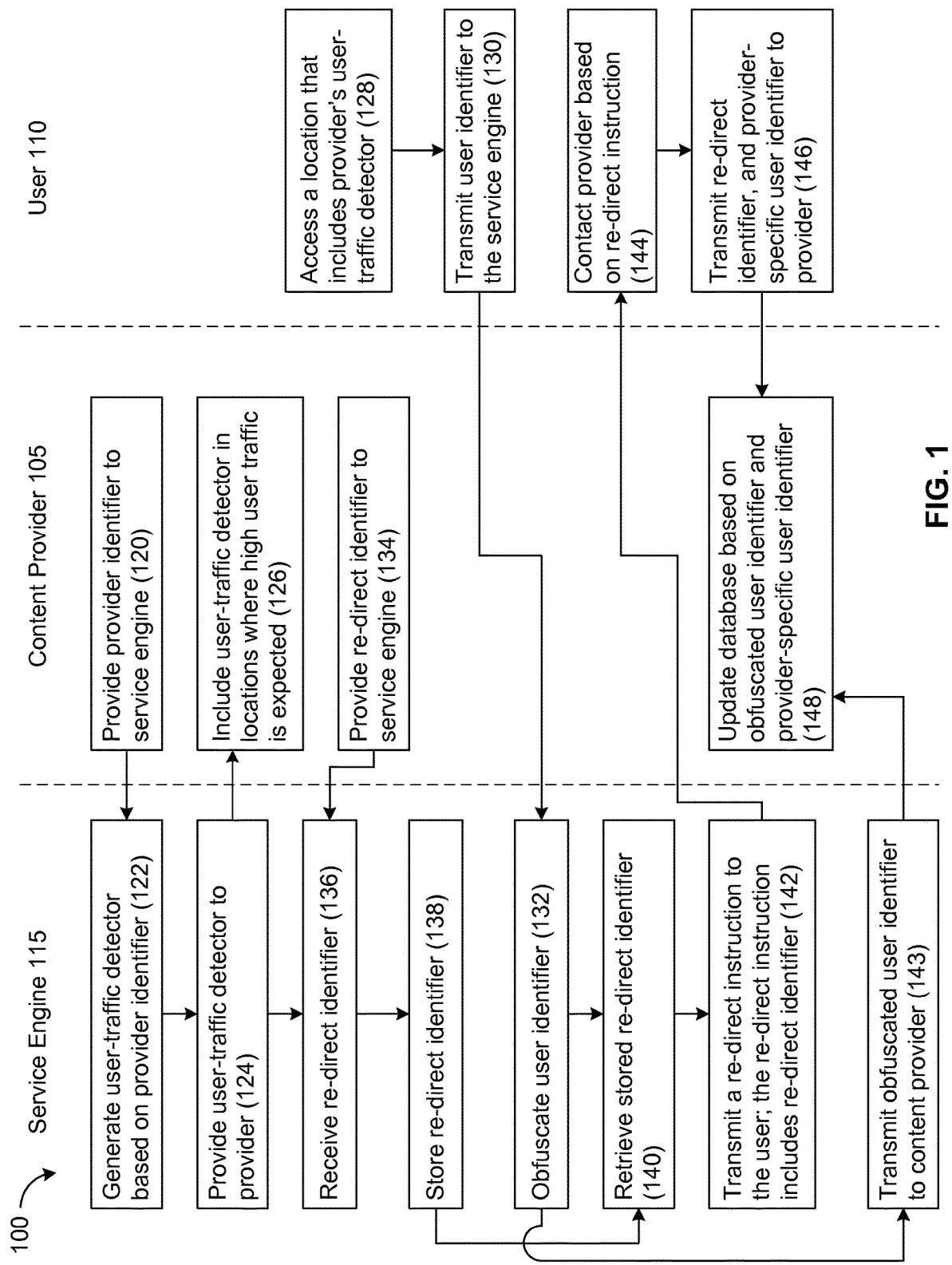
FIG. 1 is flow diagram describing an example process for matching content providers and interested content users.

A service by which content providers are matched, in a cost-efficient manner, with users interested in the content, while maintaining user privacy is described. In a described example, the content providers are advertising networks, each representing multiple advertisers. The advertisers in an advertising network are passive advertisement providers who want to run advertisement campaigns to promote their products and services. To this end, the advertisers have advertisements promoting their products and services, but may not have the ability to present the advertisements in real-time to users. Consequently, advertisers subscribe to content providers, such as advertising networks, that have the ability to present advertisements in real-time, for example, using advertisement servers. Multiple advertising networks, each representing multiple advertisers, compete to present advertisements of respective advertisers in multiple network locations, determined to be relevant to the respective advertisers. Such competitions are conducted by service providers similar to the one described with reference to FIG. 3.

For example, service providers conduct auctions in which multiple advertisers bid, and the advertisement of the auction winner is presented to the user. Using the processes described below, content providers (e.g., advertising networks) can identify users who are about to view content (e.g., advertisements) prior to bidding in the auction. As described later, the advertising networks can do so using an obfuscated user identifier that is passed to the content provider. The networks can build a database of information around this obfuscated user identifier and bid in auctions to present advertisements to the user according to the perceived value of the user. In addition, the networks can maintain a database of information about users; such users being identified by network-specific user identifiers, for example, networks' cookies in the users' browsers. Advertising networks can associate the obfuscated user identifiers with the network-specific user identifiers to connect the request to show content in the user's browser with the information about the user stored in their database.

A process 100 is described with reference to FIG. 1 by which a content provider is enabled to determine if a particular user will be interested in the products of individual providers that the content provider collectively represents. This determination will allow the individual providers to decide whether or not to compete to present an advertisement to the user. An example of the content provider is an advertising network and an example of the individual providers are the advertisers that have subscribed to the advertising network. Other examples of content providers can include any network capable of serving any type of content, for example, using content servers, received from multiple providers that have subscribed to the network. As described below, in some implementations, content providers, in general, provide content by matching a provider-specific user identifier that is generated by the user, and an obfuscated version of a user identifier that is provided to the content provider.

FIG. 1 is a flow diagram describing an example process 100 for matching content providers and interested content users. The process 100 includes multiple steps performed by a content provider 105, a user 110, and a service engine 115 that, in some implementations, communicate with each other through one or more networks such as, for example, the Internet. The content provider 105 provides a provider-identifier that identifies the content provider to the service engine 115 (step 120). Examples of provider-identifiers are described later. The service engine 115 generates a user-traffic detector based on the provider-identifier received from the content provider 105 (step 122). In some implementations, as described later, the user-traffic detector is a Uniform Resource Locator (URL) in Hyper Text Markup Language (HTML) format. The content provider 105 includes the user-traffic detector in a web page of a website or in one or more items of content or both. The service engine 115 configures the user-traffic detector to detect an accessing of a network location by multiple users when the user-traffic detector is associated with the network location. For example, when the network location is a web page of a website, the user-traffic detector may be a URL that the content provider 105 includes in the web page. When the web page is accessed by the user 110, the user-traffic detector detects the accessing.

The service engine 105 provides the generated user-traffic detector to the content provider 105 (step 124). The content provider 105 includes the user-traffic detector in locations where high user traffic is expected (step 126). In some scenarios, the content provider 105 includes the user-traffic detector in multiple web pages of multiple websites that include content relevant to that of the individual providers that the content provider 105 represents. For example, the content provider 105 includes a URL representing the user-traffic detector in web pages of the individual providers' websites. To do so, the content provider includes the URL representing the user-traffic detector in the source code of the web page. In addition, the content provider 105 can request publishers of websites to include the user-traffic detector in web pages of the publishers' websites. After the content provider 105 includes the user-traffic detector at multiple network locations, the service engine 115 can detect the accessing of the locations. In alternative implementations, the content provider can include the URL representing the user-traffic detector in advertisements to be served to users. In such implementations, the service engine 105 can detect the event of the user seeing the advertisement.

In some implementations, in addition to providing a provider identifier, the content provider 105 provides a re-direct identifier to the service engine (step 134). The re-direct identifier points to a network location associated with the content provider 105. As described later, in some implementations, the re-direct identifier is a URL pointing to the network location that includes the content provider's content. The service engine receives the re-direct identifier (step 136) and stores the same (step 138), for example, in a database of re-direct identifiers. Each of the re-direct identifiers in the database can be previously received from individual providers that are represented by the content provider. For example, in scenarios in which the content provider is an advertising network representing multiple advertisers, the re-direct identifier is a URL provided that represents the multiple advertisers and points to a network resource representing, for example, the advertising network's servers.

The user 110 accesses a location that includes the content provider's user-traffic detector (step 128). In some implementations, the network location is a web page of a website that includes the content provider's user-traffic detector. The user 110 accesses the web page by entering a URL pointing to the web page in a browser displayed in the user's computer. When the user accesses the web page that includes the content provider's user-traffic detector, the user 110 transmits an indication of the accessing to the service engine 115. With the indication, the user 110 transmits a user identifier identifying the user (step 130). For example, when the user's browser reads the source code of the accessed web page that includes the content provider's user-traffic detector, the browser transmits the indication to the service engine 115 and also transmits a user identifier. In some implementations, the user identifier is a service engine cookie that is included in an internal database of cookies of the user's browser.

Upon receiving the user identifier from the user 110, the service engine 115 obfuscates the user identifier (step 132). In some implementations, the service engine 115 generates a hash of the received user identifier to generate an obfuscated user identifier. In general, to obfuscate the user identifier, the service engine 115 can employ any irreversible mapping such that the obfuscation is not reversible. Examples of obfuscation algorithms that can be employed include any encryption algorithm that uses a function of the provider identifier as an encryption key, such as, for example, RSA encryption. Alternatively, or in addition, the obfuscation can be performed by any hash function that depends on the provider identifier, such as, for example, an MD5 of the user identifier to which the provider identifier is appended.

Because the user's browser transmits the indication to the service engine 115, the engine 115 determines the content provider 105, based on the indication. In some implementations, the indication transmitted by the user's browser includes the content provider's user-traffic detector. Using the detector, the service engine 115 identifies the content provider 105. In some implementations, the user identifier is obfuscated based on the identity of the content provider 105. In such implementations, the service engine 115 obfuscates the user identifier after receiving the indication transmitted by the user's browser that includes the content provider's user-traffic detector. Having identified the content provider 105, the service engine 115 retrieves the stored re-direct identifier corresponding to the content provider 105 (step 140). Subsequently, the service engine 115 generates and transmits a re-direct instruction to the user's browser 110 (step 142). The re-direct instruction includes the re-direct identifier that is previously received from the content provider 105. Also, the service engine 115 transmits the obfuscated user identifier to the content provider 105 (step 143). When the service engine 115 transmits the re-direct instruction including the re-direct identifier the user 110 contacts the content provider 105 based on the re-direct instruction (step 144). The user 110 transmits the re-direct identifier received from the service engine 115, and a content provider-specific user identifier to the content provider (step 146). The content provider-specific user identifier is an identifier which the content provider uses to identify the user. For example, in scenarios in which the content provider is an advertising network, the provider-specific user identifier is a hypertext transmission protocol cookie, representing the network, that is stored on user's computer. Because of the security models employed by the browser, two content providers cannot share the same user identifier. Consequently, the user identifier is provider-specific. The user's browser 110 contacts the content provider 105 using the re-direct identifier received from the service engine 105.

Upon receiving the obfuscated user identifier from the service engine 105 and the provider-specific user identifier from the user 110, the content provider 105 provides the content associated with the re-direct identifier to the user. The content provider 105 maintains a database of obfuscated user identifiers and content provider-specific user identifiers, and updates the database based on the identifiers received from the service engine 105 and the user 110 (step 148). For example, if this transaction is the first instance of the content provider 105 providing content to the user 110, then the content provider 105 creates an entry associated with the user 110 in the database. If the content provider 105 has previously provided content to the user 110, then the content provider 105 updates the database accordingly.

In some implementations, the steps including the user transmitting the user identifier to the service engine 115 (step 130), the user transmitting the re-direct identifier, and the content provider-specific user identifier to the content provider 105 (step 146), and the service engine 115 transmitting the obfuscated user identifier to the content provider 105 are performed in real-time. In such implementations, the content to be provided is stored by the content provider 105, and not by the service engine 115. Further, in such implementations, the service engine 115 does not receive content from the content provider 105 and provide the same to the user 110. Rather, the content provider 105 communicates directly with the user 110 to transmit content. During this direct communication, the content provider 105 receives both the content provider-specific identifier and the obfuscated user identifier from the user 110 and the service engine 115, respectively. Because only the obfuscated user identifier is transmitted to the content provider 105, the content provider 105 does not receive private information about the true identity of the user 110. Nevertheless, the content provider 105 is equipped to identify the user 110 in a subsequent transaction based on the obfuscated user identifier. Further, the service engine 115 does not receive the content provider-specific identifier by which the content provider 105 identifies the user 110.

By updating the database using the steps associated with process 100, the content provider 105 can identify users to whom content is provided. As described with reference to FIG. 3, when requests for bids are received from a service provider that conducts auctions involving multiple content providers to present content to users, the request for bids includes obfuscated user identifiers so that the content provider 105 can bid based on previous transactions with the user 110. In some implementations, the service provider that conducts the auctions can be operatively coupled to and/or be included in the service engine 115. In some implementations, the process 100 can be implemented by advertising networks, as described with reference to FIG. 2.

Figure 2:
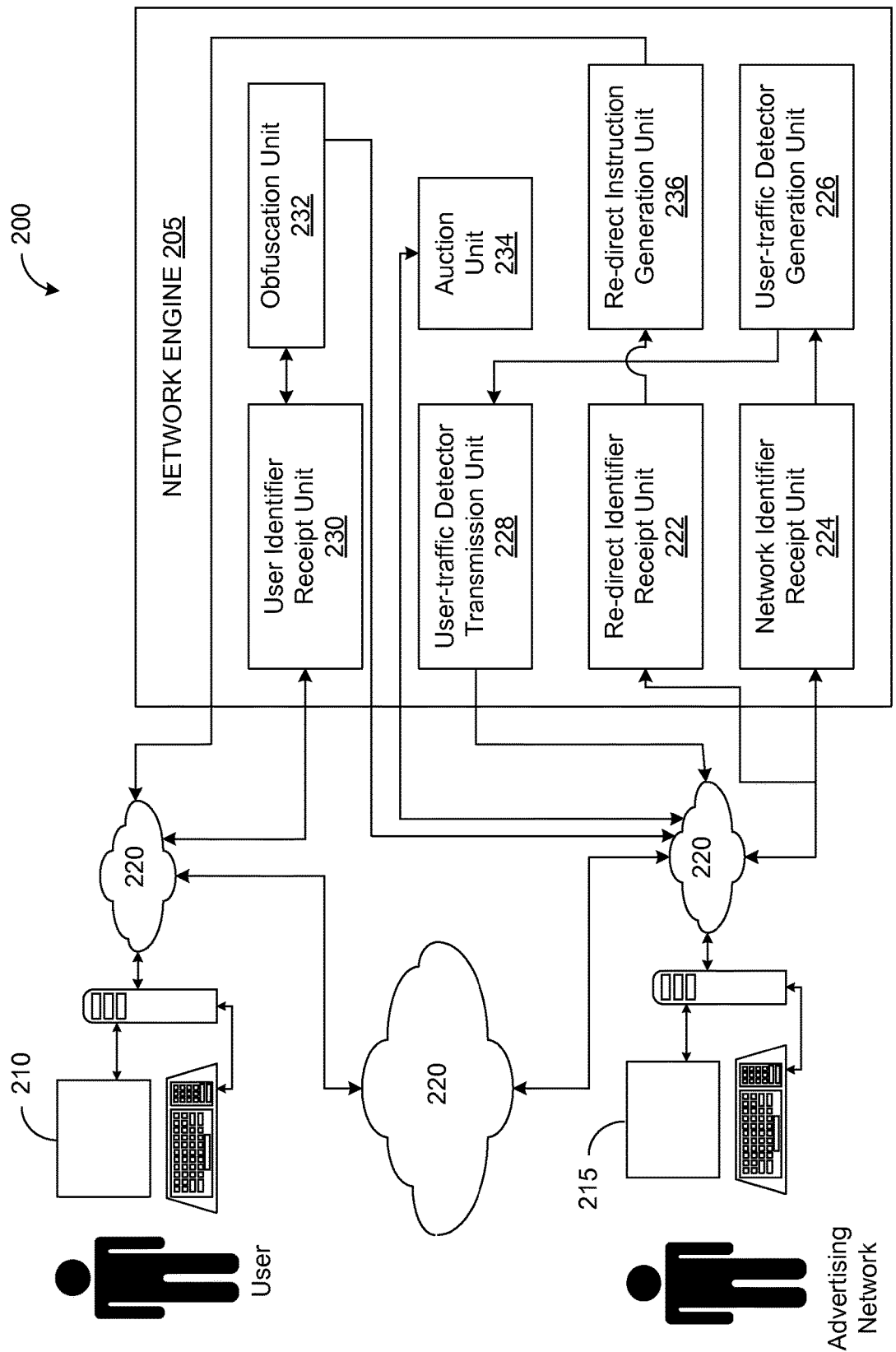
FIG. 2 is an example system for matching advertising networks and users.

FIG. 2 is an example system 200 for matching advertising networks and users. The system 200 includes a network engine 205, a user computer 210, and an advertising network computer 215 operatively coupled to each other via one or more networks 220, such as, for example, the Internet. The advertising network computer 215 can include one or more servers operatively coupled to each other, to the user's computer, and to the network engine 205 through the networks 220. The user computer 210 can include a desktop computer, a laptop computer, a personal digital assistant (PDA), and the like. The user's computer 210 includes a display device in which the user's browser can be displayed.

As described below, in some implementations, the network engine 205 is configured to request content, such as advertisements from the advertising network, for presenting to users that are identified by the network engine 205 using unique identifiers. The network engine 205 is further configured to enable advertising networks that maintain a database of user information, including network-specific user identifiers, to associate this user information with advertisement requests from the network engine 205. Further, the network engine 205 enables the advertising networks to do so without the advertising networks viewing the unique identifiers maintained by the network engine 205 and without the network engine 205 viewing the network-specific user identifiers maintained by the advertising networks. In some scenarios, the network engine 205 enables the advertising networks to identify users so that the advertisers represented by the networks can compete to present advertisements to the users in real-time based upon prior interest expressed by the users in the advertisers' products.

In some implementations, the network engine 205 includes a re-direct identifier receipt unit 222 to receive a re-direct identifier from the advertising network's computer 215. The re-direct identifier identifies a network location associated with the advertising network. For example, the re-direct identifier is a URL that points to the advertising network's network location, such as, the advertising network's server or servers on which the network maintains and updates the database of obfuscated user identifiers and provider-specific user identifiers. The network engine 205 further includes a network identifier receipt unit 224 to receive an advertising network identifier from the advertising network. In some implementations, the advertising network identifier is a number, such as, for example, 1234. In other implementations, the advertising network identifier is any combination of alphanumeric characters with or without symbols that is unique to the advertising network.

The network engine 205 includes a user-traffic detector generation unit 226 to generate a user-traffic detector, as described previously. In some implementations, the user-traffic detector is an HTML tag that can resolve to an invisible 1×1 pixel having the following format:
<img src=http://pixel.g.ads.net/pixel?advertising network_id=1234> The user-traffic detector generation unit 226 includes the network identifier in the detector. The network engine 205 includes a user-traffic detector transmission unit 228 to transmit the traffic detector to the advertising network's computer 215, which is configured to include the traffic detector in an advertisement such that, when the advertisement is presented on the user's computer 210, the traffic detector is also presented. Alternatively, or in addition, the advertising network's computer 215 associates the user-traffic detector at multiple network locations. For example, the advertising network's computer 215 includes the URL representing the detector in the source code of multiple web pages of websites. In some implementations, in addition to the advertising network's computer 215, the network engine 205 also includes the user-traffic detector at multiple network locations, different from the advertising network's network locations, as a service to the advertiser. As described later, the network engine 205 performs this operation in response to a request from the advertising network.

In some implementations, when the browser of the user's computer 210 accesses network locations in which the advertising network's user-traffic detector are included, the user's computer 210 transmits information about the user, including the user identifier, to the network engine 205. The network engine 205 includes a user identifier receipt unit 230 that receives the user identifier and determines that the user has accessed network locations with which the user-traffic detector is associated. The unit 230 receives user information from the user's computer 210, for example, when the user browses network locations.

The network engine 205 includes an obfuscation unit 232 that generates an obfuscated user identifier by obfuscating the received user identifier, as described previously. For example, the obfuscation unit 232 can generate a hash of the received user identifier. The generated hash can have collisions. The same user can have different hashed identifiers for different advertising networks. In some scenarios, the hash of a user identifier can be the same for multiple advertisers in an advertising network. Further, the obfuscation unit 232 can provide the obfuscated user identifier to the advertising network, for example, by transmitting the obfuscated user identifier to the advertising network's computer over the network 220. The unit 236 generates an instruction for transmission to the user. The instruction includes the re-direct identifier pointing to the network location associated with the advertising network. The instruction further instructs the user's browser to contact the advertising network directly for the advertisement to be presented at the network location that the user's browser has accessed. Further, the unit 236 provides the obfuscated user identifier to the user's computer 210. Based on the re-direct identifier in the re-direct instruction, the user's computer 210 contacts the advertising network's computer 215 and provides a network-specific user identifier. The network-specific user identifier can be a hyper text transmission protocol (HTTP) cookie that includes a string of text stored on the user's computer 210 by the user's web browser. The cookie can include one or more name-value pairs containing bits of information such as user preferences, shopping cart contents, the identifier for a server-based session, or other data used by websites. In response, the advertising network's computer 215 provides the user's computer 210 with the 1×1 pixel. In some implementations, the 1×1 pixel provided to the user's computer 210 is an advertisement.

The advertising network's computer 215 is configured to host a database including, for example, a match table that associates obfuscated user identifiers with the network-specific user identifiers. For every instance that the user's computer 210 accesses the network location that includes the advertising network's user traffic detector, the advertising network updates the database. Further, for every new user that accesses the network location, the advertising network includes the new obfuscated user identifier and the new network-specific user identifier in the database along with the associations between them. Based on the associations, advertisers in the advertising network can make future decisions related to bidding in the auctions for presenting advertisements to the users, as described below.

In some implementations, the network engine 205 can include an auction unit 234 that includes the advertiser in an auction for presenting advertisements to the user. The auction unit 234 can be included in the network engine 205, as illustrated in FIG. 2, or can be remotely located from and operatively coupled to the network engine 205 through the networks 220, for example. The auction unit 234 can include the advertisers of the advertising network in the auction when the user identifier receipt unit 230 determines that the user has accessed the network location associated with the advertiser. The auction unit 234 can receive bids from the computers of multiple advertisers, determine that the bid received from the advertiser's computer 215 is the highest, and transmit an indication to the advertiser's computer 215 that the advertiser has won the auction. As described previously, advertisers in the advertising networks can decide to participate in the auction based on transactions with the user 210 that the advertisers can identify based on the matching of the obfuscated user identifier and the network-specific user identifier.

Figure 3:
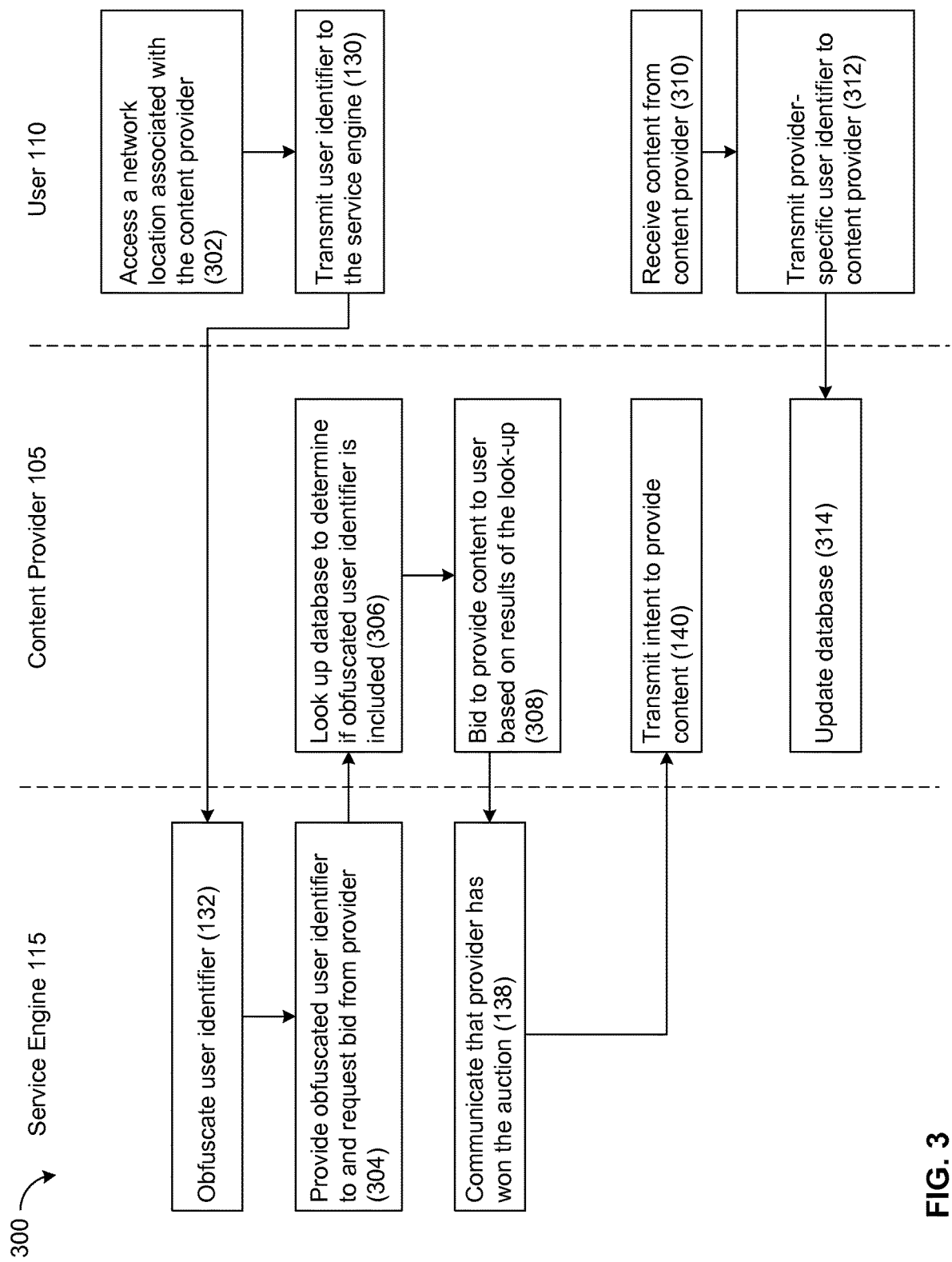
FIG. 3 is a flow diagram describing an example process for providing advertisements to users based on an auction.

FIG. 3 is a flow diagram describing an example process 300 for providing advertisements to users based on an auction. In some implementations, the user accesses a network location associated with the content provider (step 302). The service engine 115 detects the accessing and receives the user identifier. The service engine obfuscates the user identifier (step 132) and provides the obfuscated user identifier to the content provider 105. In addition, the service engine 115 requests a bid from the content provider 105 (step 304). In some scenarios, by requesting bids from several content providers, the service engine 115 conducts an auction and presents the content of the winner of the auction to the user. To decide whether or not to bid based on the obfuscated user identifier, the content provider 105 looks up the database of obfuscated user identifiers to determine if the received obfuscated user identifier is present (step 306). In addition, the content provider 105 can decide a quantity to bid based on the obfuscated user identifier.

In some implementations, the content provider 105 bids to provide content to the user based on the results of the look up (step 308). For example, if the content provider finds the obfuscated user identifier in the database, then the content provider 105 can decide to bid to provide content to the user represented by the obfuscated identifier. If the content provider finds that the user has recently transacted with the content provider, and specifically, used the content provider's content, for example, by purchasing, then the content provider 105 can choose to bid high to win the auction. Alternatively, if the obfuscated identifier is not found in the database or if it is found, yet transactions between the user represented by the identifier and the content provider have not occurred for more than a pre-determined duration, such as, for example, a week, then the content provider can decide to either not bid or to bid low in the auction.

If the content provider 105 wins the auction, then the service engine 115 communicates that the content provider 105 has won the auction (step 138). In addition, the service engine 115 requests that the content provider 105 transmit an intent to provide content to the user 110. In response, the content provider 105 transmits an intent to provide content (step 140). In some implementations, the intent to provide content is an acknowledgement message in response to receiving a communication that the content provider has won the auction. In some implementations, the service engine 115 receives the content provider's intent to provide content and, in response, connects the advertiser and the user 110. The user 110 receives content from the advertiser through the content provider (step 310) and transmits a provider-specific user identifier to the content provider (step 312). The content provider 105 updates the database (step 314) based on the transaction that occurs between the content provider 105 and the user 110. Some implementations by which the service engine 115 conducts the auction are described in U.S. application Ser. No. 12/394,835.

Figure 4:
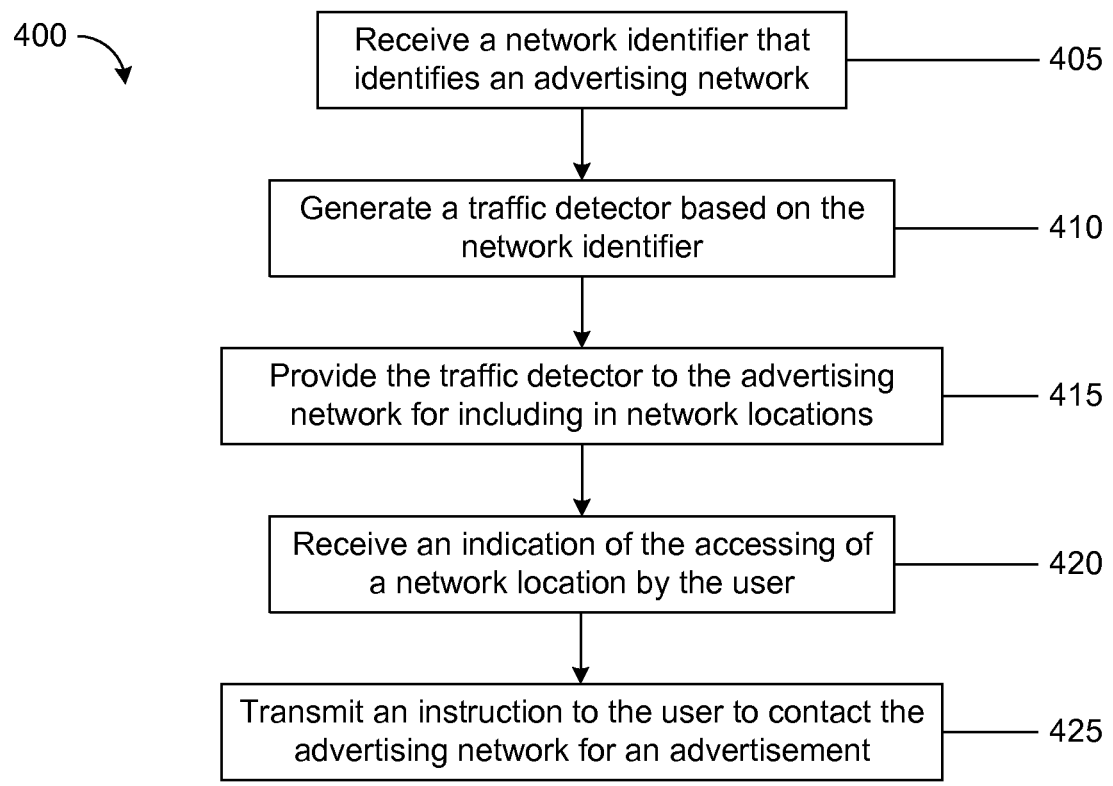
FIG. 4 is a flow chart of an example process for re-directing users to advertising networks.

FIG. 4 is a flow chart of an example process 400 for re-directing users to advertising networks. The process 400 performs the steps of receiving a network identifier (405), generating a traffic detector (410), providing the traffic detector to the advertising network (415), receiving an indication of the accessing of a network location by a user (420), and transmitting an instruction to the user to contact the advertising network (425), as described with reference to the network engine 205. As described previously, in some implementations, the advertising network includes the user traffic detector in multiple network locations. In alternative implementations, described with respect to FIG. 5, the advertising network and the network engine include the user traffic detector in multiple network locations.

Figure 5:
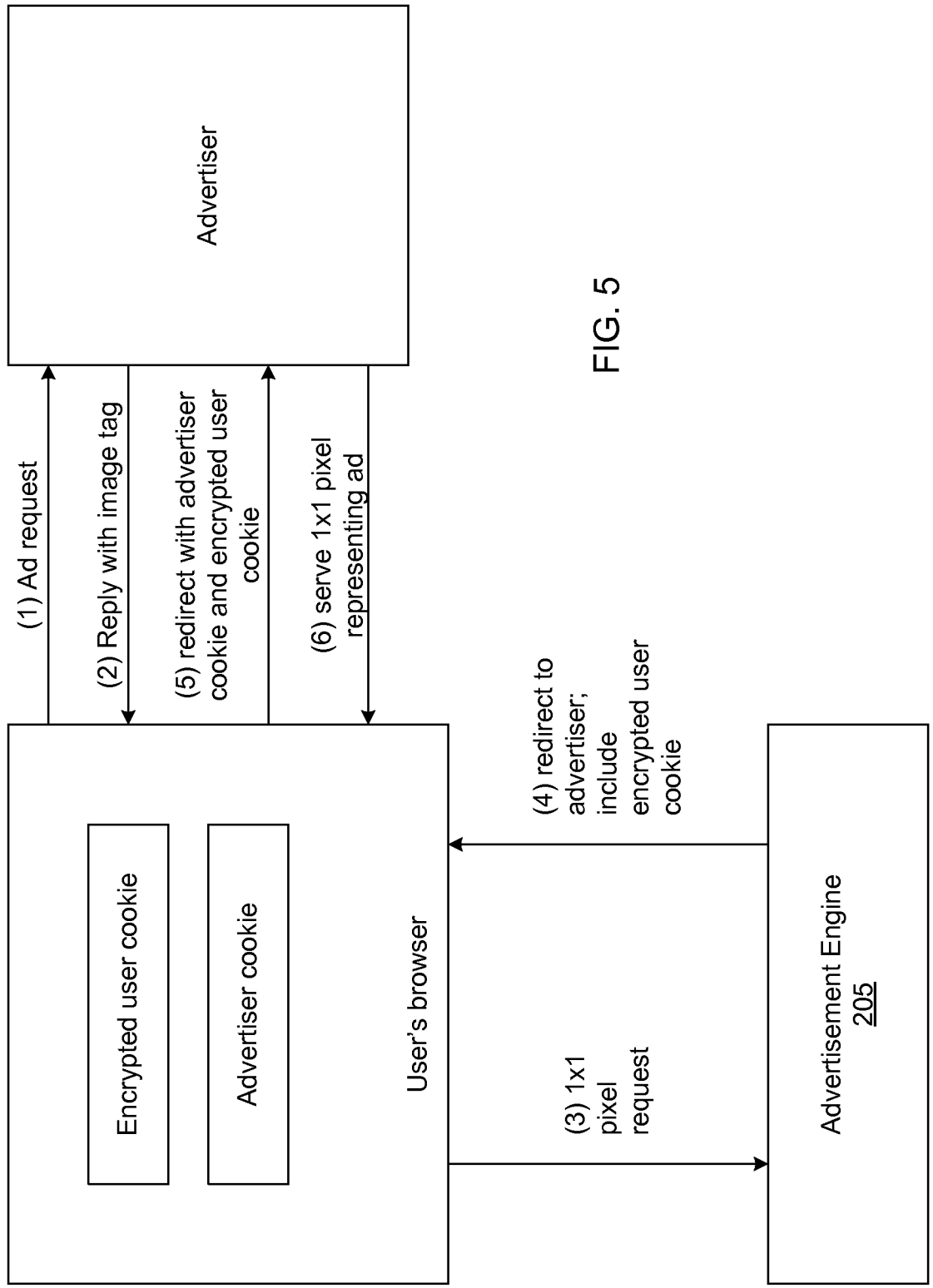
FIG. 5 is a flow diagram describing an example sequence for transmitting advertisements from advertising networks to users.

FIG. 5 is a flow diagram describing an example sequence for transmitting advertisements from advertising networks to users. In the implementation described with reference to FIG. 4, the user identifier is a user cookie received by the network engine 205 and the network-specific user identifier is a network cookie received by the advertising network. As discussed previously, the advertising network receives an image tag having an HTML format that includes the network's identifier. The advertising network serves the image tag whenever the advertising network provides an advertisement. The advertising network can serve advertisements either using the network engine or using a different service or both. In some implementations, the advertising network serves the image tag every time the advertising network serves an advertisement.

In some implementations, the advertising network serves the image tag once during a specified time window for a particular user, for example, once every seven days for the particular user. Generally, the advertising network serves the image tag only if the particular user is not included in the database that matches obfuscated user identifiers with the network-specific user identifiers or if an entry in the database related to the particular user is stale, for example, when the particular user has not communicated with the advertising network for a duration exceeding the specified time window.

The user's browser places an ad request when the browser accesses a web page of a website that includes the advertising network's image tag. The advertising network responds with an advertisement that includes the advertising network's image tag. The user's browser transmits the image tag and the user's cookie to the network engine. In response, the user's browser receives an obfuscated user's cookie and a network-specific re-direct identifier. In some implementations, the network engine has previously received the re-direct identifier from the advertising network. The re-direct identifier can be a URL having the following format:

http://ad.advertising network.com/pixel?id=2942942934 In the above URL, "id" refers to the obfuscated user's cookie and http://ad.advertising network.com/pixel is the network-specific URL.

When the advertising network receives the network-specific URL from the user's browser, the advertising network also receives the network's cookie from the browser. The advertising network is responsible for monitoring traffic at the network location to which http://ad.advertising network.com/pixel points and serving a 1×1 pixel on the user's browser. Further, the advertising network updates the database, for example, stored as a matching table, with the association between the network's cookie and the obfuscated user cookie.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the actions recited in the claims can be performed in a different order and still achieve desirable results. In some implementations, the content provided by the content provider can be text. Alternatively, or in addition, the content can be audio, video, or their combinations. The content is not limited to advertisements, but can include any type of content. For example, multiple news groups can compete to present a URL pointing to a content containing news presented by a particular news group on a web page of a website being browsed by the user. When an advertiser receives an obfuscated user identifier for the first time, i.e., the advertising network's database does not include the received obfuscated user identifier, the advertising network can determine whether or not to bid to present advertisements to the user represented by the obfuscated user identifier based on user information including the user's geographic location, demographic information about the user and the like. Such information can be collected by the service engine and provided to the user. In some implementations, content providers can request the service engine to present the user-traffic detector generated for the particular content provider at network locations associated with the service engine or other content providers or both. For example, a particular advertising network can request the service engine to associate the particular advertising network's image tag with the web pages of websites associated with the service engine or those of other advertising networks.

What is claimed is:

1. A method, performed by one or more computers, the method comprising:
receiving, by one or more computers, from a content provider, a network identifier that identifies the content provider;
generating, based on the network identifier received from the content provider, traffic detecting code;
providing the traffic detecting code to the content provider, wherein the content provider includes the traffic detecting code in a particular web page of a content publisher, and wherein the traffic detecting code causes a device that accesses the particular web page to transmit a user identifier of the user and the network identifier of the content provider to the one or more computers;
determining, by the one or more computers, that the device of the user is accessing the particular web page that includes the traffic detecting code based on the user identifier of the user and the network identifier of the content provider being generated by the traffic detecting code;
determining, by the one or more computers, that the content provider is associated with the traffic detecting code based on the network identifier of the content provider being generated by the traffic detecting code,
obfuscating, by the one or more computers, the user identifier received from the device of the user to generate an obfuscated user identifier, and
transmitting, by the one or more computers, to the content provider identified by the network identifier of the content provider received from the device of the user, the obfuscated user identifier rather than an identity of the user to request for content to be provided to the user;
matching, by the one or more computers and in a match table, the obfuscated user identifier to a provider-specific identifier different from the obfuscated user identifier;
receiving, from the content provider based on the obfuscated user identifier, an intent to provide content to the user; and
generating and transmitting, by the one or more computers and to the device of the user in response to receiving the intent to provide the content to the user from the content provider, a re-direct instruction that causes the device of the user to (i) contact the content provider for the content and (ii) transmit to the content provider the provider-specific identifier different from the obfuscated user identifier based on the match between the obfuscated user identifier and the provider-specific identifier in the match table.

2. The method of claim 1, further comprising: after providing the traffic detecting code to the content provider, receiving the user identifier and the network identifier of the content provider from a network browser which the user uses to access the particular web page.

3. The method of claim 1, further comprising:
generating the traffic detecting code to cause the device associated with the user to detect that a web page that includes the traffic detecting code has been accessed.

4. The method of claim 1, wherein the obfuscated user identifier is specific to the content provider and is generated by hashing the user identifier received from the device of the user.

5. The method of claim 1, wherein the re-direct instruction includes a re-direct identifier, wherein the re-direct identifier is a uniform resource locator that includes the obfuscated user identifier.

6. A non-transitory computer-readable medium tangibly embodying software instructions executable by one or more computers to perform operations comprising:
receiving, from an advertising network, a network identifier that identifies the advertising network;
generating, based on the network identifier received from the advertising network, traffic detecting code;
providing the traffic detecting code to the advertising network, wherein the advertising network includes the traffic detecting code in a particular web page of a content publisher, and wherein the traffic detecting code causes a device that accesses the particular web page to transmit a user identifier of the user and the network identifier of the advertising network to the one or more computers;
determining, that the device of the user is accessing the particular web page that includes the traffic detecting code based on the user identifier of the user and the network identifier of the advertising network being generated by the traffic detecting code;
determining that the advertising network is associated with the traffic detecting code based on the network identifier of the advertising network being generated by the traffic detecting code,
obfuscating the user identifier received from the device of the user to generate an obfuscated user identifier, and
transmitting, to the advertising network identified by the network identifier of the advertising network received from the device of the user, the obfuscated user identifier rather than an identity of the user to request for content to be provided to the user;
matching, in a match table, the obfuscated user identifier to a network-specific identifier different from the obfuscated user identifier;
receiving, from the advertising network based on the obfuscated user identifier, an intent to provide an advertisement to the user; and
generating and transmitting, to the device of the user in response to receiving the intent to provide the advertisement to the user from the advertising network, a re-direct instruction that causes the device of the user to (i) contact the advertising network for the advertisement and (ii) transmit to the advertising network the network-specific user identifier different from the obfuscated user identifier based on the match between the obfuscated user identifier and the network-specific identifier in the match table.

7. The non-transitory computer-readable medium of claim 6, wherein text of the traffic detecting code includes the network identifier.

8. The non-transitory computer-readable medium of claim 6, wherein the traffic detecting code comprises an HTML image tag.

9. The non-transitory computer-readable medium of claim 6, wherein the user identifier of the user and the network identifier of the advertising network are received from a network browser in which the user accesses the particular web page, in response to the user accessing the particular web page using the network browser.

10. The non-transitory computer-readable medium of claim 6, the operations further comprising:
receiving a re-direct identifier from the advertising network, the re-direct identifier representing a network resource associated with the advertising network; and
including the re-direct identifier in the re-direct instruction that is transmitted to the device of the user, wherein the device of the user transmits the re-direct identifier to the advertising network.

11. The non-transitory computer-readable medium of claim 10, wherein the network resource is the advertisement.

12. The non-transitory computer-readable medium of claim 10, wherein the network resource is a network location including the advertisement.

13. The non-transitory computer-readable medium of claim 10, wherein the network resource is a network location associated with the advertiser.

14. A system comprising:
one or more computers; and
a computer-readable medium tangibly embodying software instructions executable by one or more computers to perform operations comprising:
receiving, from content provide, a network identifier that identifies the content provider;
generating, based on the network identifier received from the content provider, traffic detecting code;
providing the traffic detecting code to the content provider, wherein the content provider includes the traffic detecting code in a particular web page of a content publisher, and wherein the traffic detecting code causes a device that accesses the particular web page to transmit a user identifier of the user and the network identifier of the content provider to the one or more computers;
determining that the device of the user is accessing the particular web page that includes the traffic detecting code based on the user identifier of the user and the network identifier of the content provider being generated by the traffic detecting code;
determining that the content provider is associated with the traffic detecting code based on the network identifier of the content provider being generated by the traffic detecting code,
obfuscating the user identifier received from the device of the user to generate an obfuscated user identifier, and
transmitting to the content provider identified by the network identifier of the content provider received from the device of the user the obfuscated user identifier rather than an identity of the user to request for content to be provided to the user;
matching, by the one or more computers and in a match table, the obfuscated user identifier to a provider-specific identifier different from the obfuscated user identifier;
receiving, from the content provider based on the obfuscated user identifier, an intent to provide content to the user; and
generating and transmitting, by the one or more computers to the device of the user in response to receiving the intent to provide the content to the user from the content provider, a re-direct instruction that causes the device of the user to (i) contact the content provider for the content and (ii) transmit to the provider-specific identifier different from the obfuscated user identifier based on the match between the obfuscated user identifier and the provider specific identifier in the match table.

15. The system of claim 14, wherein the operations comprising: after providing the traffic detecting code to the content provider, receiving the user identifier of the user and the network identifier of the content provider from a network browser which the user uses to access a plurality of web pages.

16. The system of claim 14, the operations further comprising:
configuring the traffic detecting code to cause the device associated with the user to detect that a web page that includes the traffic detecting code has been accessed.

17. The system of claim 14, wherein the obfuscated user identifier is specific to the content provider and is generated by hashing the user identifier received from the device of the user.

* * * * *

UNITED STATES PATENT AND TRADEMARK OFFICE
CERTIFICATE OF CORRECTION

PATENT NO. : 10,977,723 B2
APPLICATION NO. : 12/507674
DATED : April 13, 2021
INVENTOR(S) : Corduneanu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2168 days.

Signed and Sealed this
Sixth Day of September, 2022

Katherine Kelly Vidal
*Director of the United States Patent and Trademark Office*